A movement support system for an openable roof of a vehicle, in particular a boat, for mounting at the site of an opening formed in the roof of the vehicle for movably supporting at least one closure element for selectively covering the opening. The system includes a pair of elongate support modules configured as rectilinear bars, for mounting on the roof of the vehicle on opposite sides of the opening. Each support element has a track element extending substantially parallel to the support element with one or more carriage elements, connectable to the closure element, mounted thereon for longitudinal sliding. The system also includes a transmission for imparting movement controlled by a motor to at least one of the carriage elements. The transmission includes a belt member connected to at least one of the carriage elements and closed in a loop about two end pulleys so as to form two belt branches extending longitudinally along the support members, which are spaced by a distance substantially the same as a transverse dimension of the carriage elements.

(12) United States Patent
Miotto et al.

(10) Patent No.: US 7,055,453 B2
(45) Date of Patent: Jun. 6, 2006

(54) MODULAR MOVEMENT SUPPORT SYSTEM FOR AN OPENABLE ROOF FOR A VEHICLE, IN PARTICULAR FOR A BOAT

(75) Inventors: Vinicio Miotto, Nichelino (IT); Valentino Leale, Rivalta di Torino (IT); Massimiliano Serra, Orbassano (IT)

(73) Assignee: OPAC S.r.l., Rivalta di Tornio (IT)

( * ) Notice: Subject to any disclaimer, the term of this patent is extended or adjusted under 35 U.S.C. 154(b) by 0 days.

(21) Appl. No.: 11/038,140

(22) Filed: Jan. 21, 2005

(65) Prior Publication Data
US 2005/0204994 A1  Sep. 22, 2005

(30) Foreign Application Priority Data
Jan. 23, 2004  (EP)  .................... 04425038

(51) Int. Cl.
*B63B 17/00* (2006.01)
(52) U.S. Cl. ......................... 114/361; 296/98
(58) Field of Classification Search ................. 114/71, 114/361; 296/98
See application file for complete search history.

(56) References Cited

U.S. PATENT DOCUMENTS 2,947,277 A * 8/1960 Stevens ................ 114/71
4,136,906 A   1/1979 Ireland et al.
4,641,600 A * 2/1987 Halvorsen ................ 114/361

FOREIGN PATENT DOCUMENTS

| EP | 1069042 A | 1/2001 |
|---|---|---|
| EP | 1232888 A | 8/2002 |
| GB | 293957 A | 7/1928 |
| WO | WO 9204199 A | 3/1992 |

* cited by examiner

Primary Examiner—Lars A. Olson
(74) Attorney, Agent, or Firm—Sughrue Mion, PLLC

(57) ABSTRACT

14 Claims, 9 Drawing Sheets

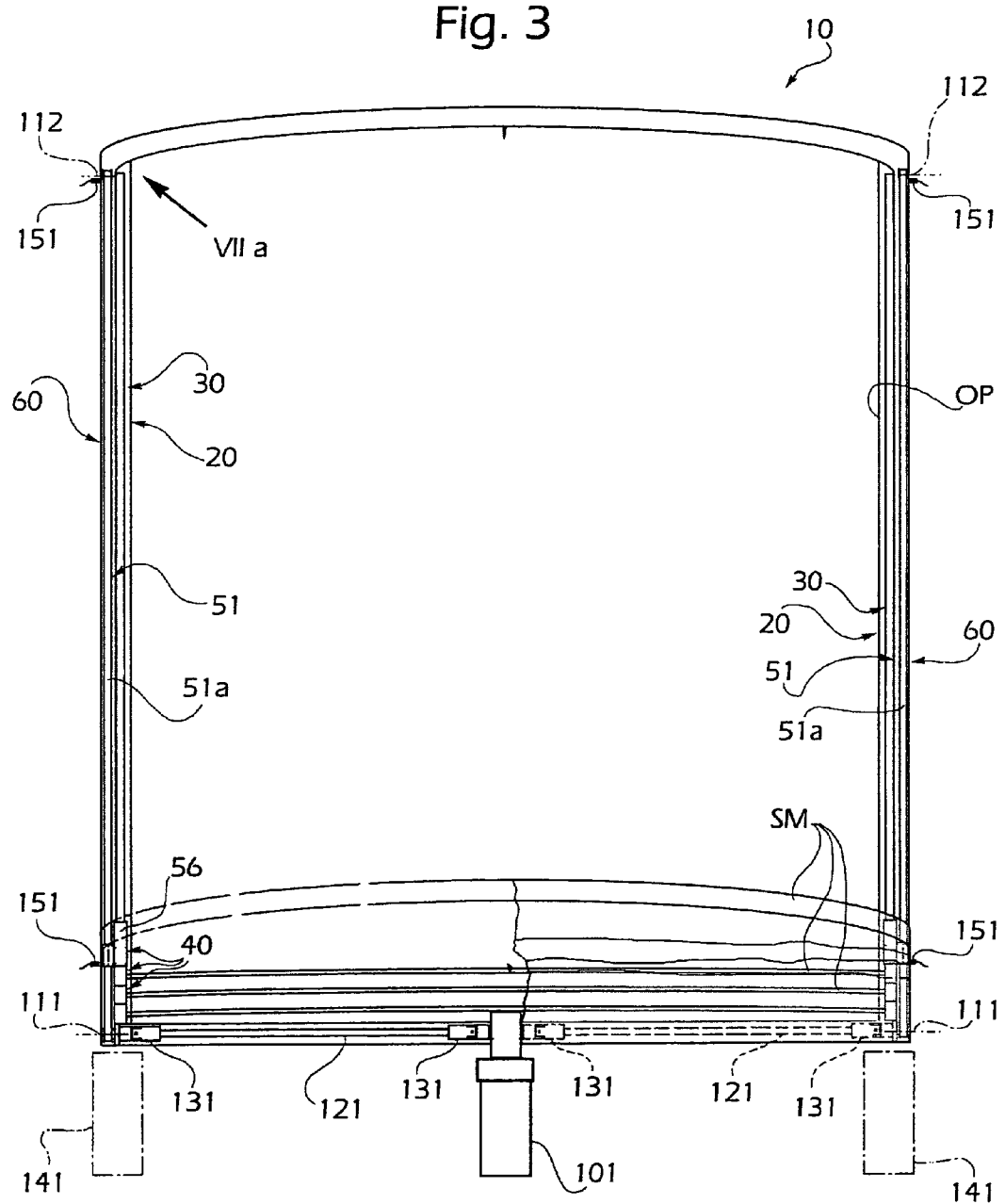

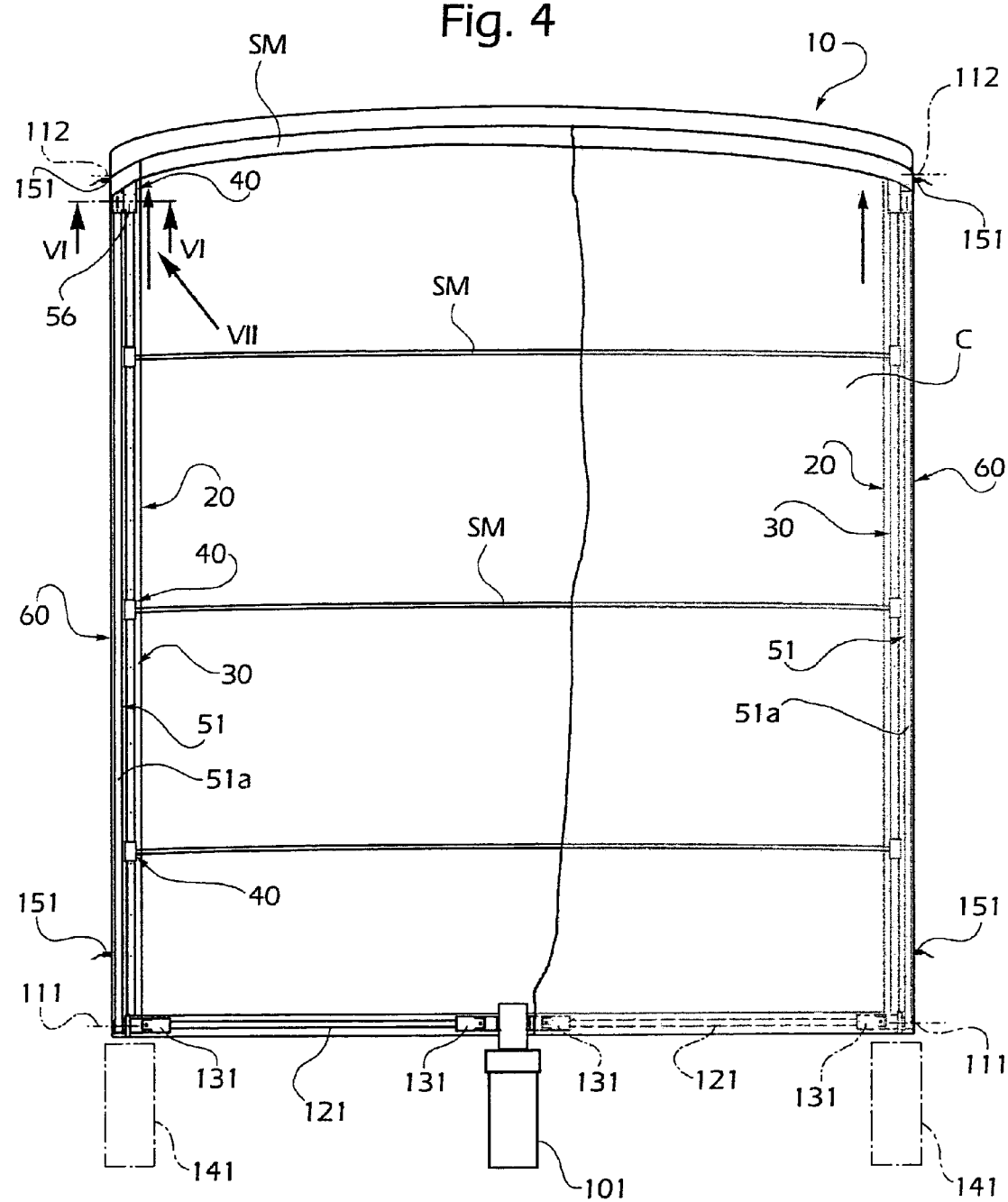

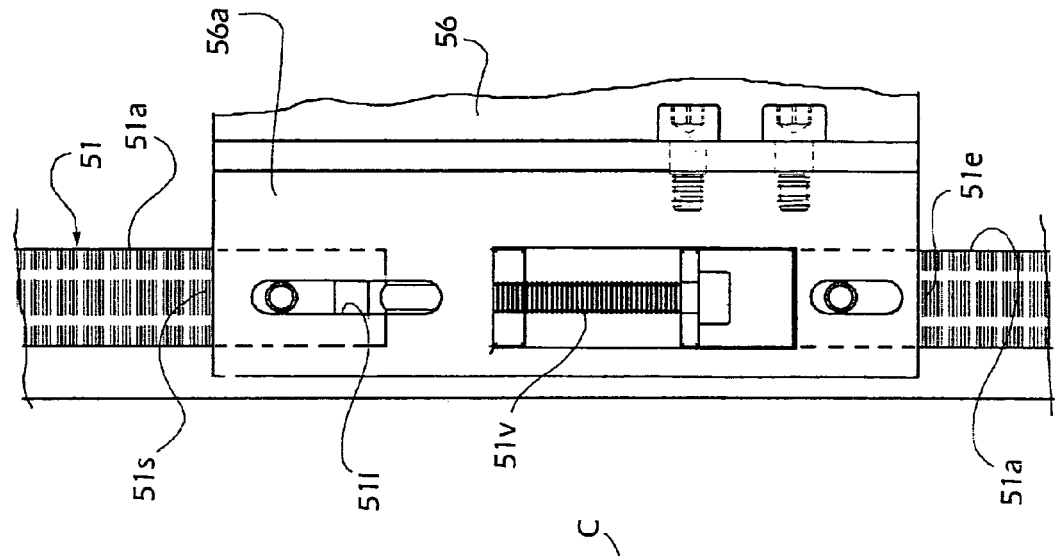
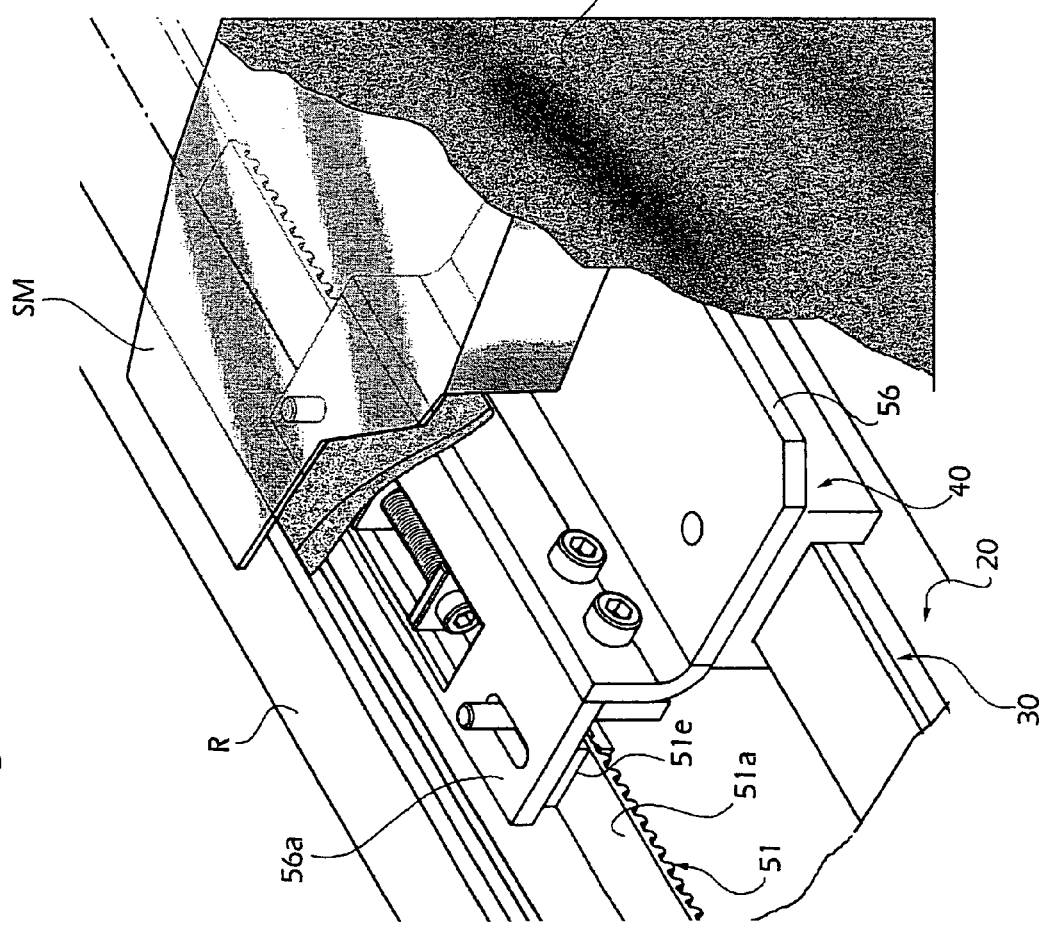

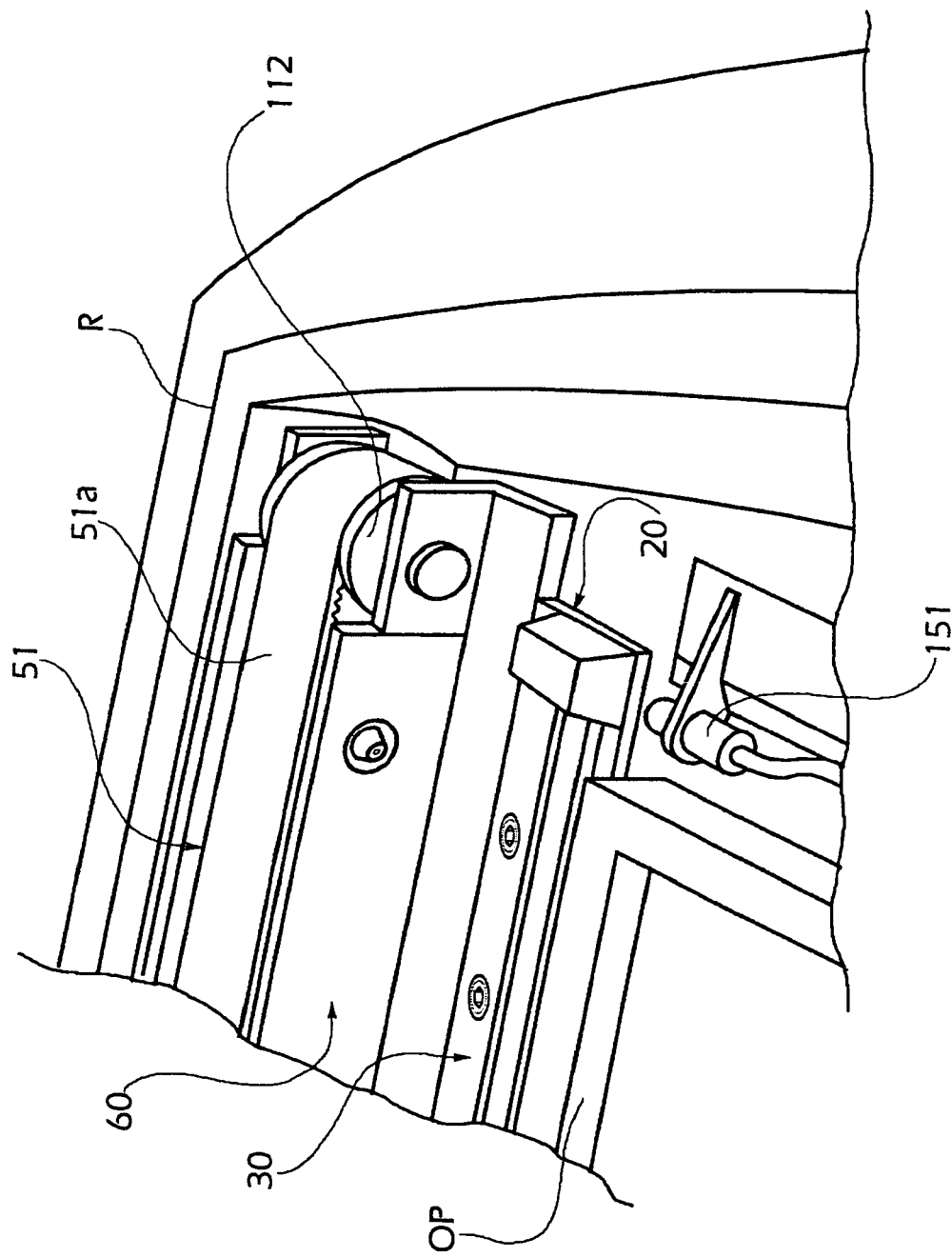

MODULAR MOVEMENT SUPPORT SYSTEM FOR AN OPENABLE ROOF FOR A VEHICLE, IN PARTICULAR FOR A BOAT

The present invention relates in general to systems for moving openable roofs for vehicles, in particular for boats.

BACKGROUND OF THE INVENTION

Such systems generally include a rectangular frame, which can be mounted to an opening formed in the roof of a vehicle. This frame has guides for a plurality of carriages to slide on, these being connected to the closure element/elements provided for selectively closing the opening in the roof. In order to do this, transmission means are provided for transmitting to the carriages movement imparted by a motor, by means, for example, of chains, cables belts or the like.

In conventional systems it is common for an openable roof configuration designed for a particular model of vehicle not to be adaptable economically for use on a different model. This problem is particularly acute in boats, where the difference in dimensions between one model and another can be considerable and where operating requirements can also be different, with regard for example to the method by which the closure elements forming the openable roof are moved. As a result, adapting any particular openable roof configuration designed for one type of craft for use on another often involves the introduction of expensive modifications or even a complete redesign of the structure.

SUMMARY OF THE INVENTION

This problem is solved according to the invention by providing a movement support system for an openable roof for a vehicle.

Additional objects of the invention are constituted by an element for supporting and an element for housing a belt, which can be assembled in a support and movement system according to the invention.

Thanks to the movement support system of the invention, as well as to the individual elements of this system, it is simpler to adapt the structure of the openable roof to the different dimensions that are required, since this adaptation involves altering the dimensions of only a few components of the structure. In addition, thanks to the way in which the various parts are assembled, it is possible to use different combinations of these elements in dependence on the required configuration.

Advantageously, the fact that the various components are assembled by means of their respective coupling formations, means that these components can be assembled in a non-permanent manner, so that should any particular components of the system develop a fault, only these components need be replaced and not the entire structure. In addition, fewer components are connected by welding than in the prior art. This is especially advantageous in the case of boats since the welding process tends to damage the anodization layer usually provided on metal elements in order to protect them from rust, whenever these include aluminium parts.

Furthermore, the fact that the system is formed from various components assembled in a non-permanent manner is particularly convenient in view of the fact that it is usual for the openable roof structure to be manufactured and fitted at two different locations which may be very distant from one another, since the system can be transported unassembled and assembled only when it is to be fitted on a craft.

BRIEF DESCRIPTION OF THE DRAWINGS

These and other objects and advantages will become more apparent from the following description of a few preferred but non-limitative embodiments of the invention, with reference to the appended drawings, in which:

FIG. 3 is a schematic plan view of a movement support system for an openable roof, shown in the condition of FIG. 1;

FIG. 4 is a schematic plan view of a movement support system for an openable roof, shown in the condition of FIG. 2;

FIG. 7 is a perspective view of a detail of FIG. 4, shown by the arrow VII in this drawing;

FIG. 7a is a perspective view of a detail of FIG. 3, shown by the arrow VIIa of this drawing;

FIG. 8 is a plan view of the detail of FIG. 7;

DETAILED DESCRIPTION OF THE INVENTION

With reference to FIGS. 1 to 5, a system 10 is described for supporting and moving the openable roof of a vehicle S, in particular a boat. This system can be mounted at an opening OP formed in the roof R of the boat S and is intended movably to support at least one closure element C for selectively covering the opening OP. FIGS. 1 to 4 show this closure element C as a foldable fabric sheet supported in a conventional manner by support members SM which are movable over the opening OP so they can selectively fold (see FIGS. 1 and 3) or extend (FIGS. 2 and 4) the sheet C, whilst in FIG. 5 the closure element C is shown as a single movable panel. It is clear that all configurations known in the art are possible, since the type of cover is not essential to the scope of the invention.

Figure 1:
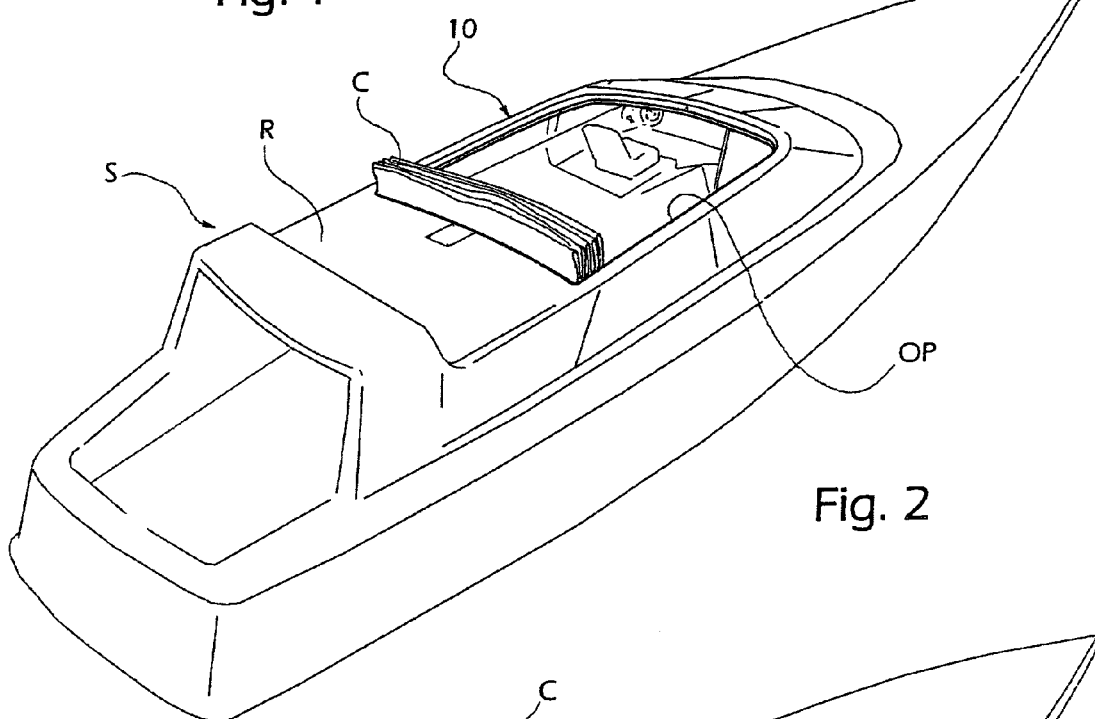
FIG. 1 is a perspective view of a vessel with a movement support system for an openable roof according to the present invention, in which the openable roof is constituted by a fabric sheet, shown in a folded condition.
Figure 2:
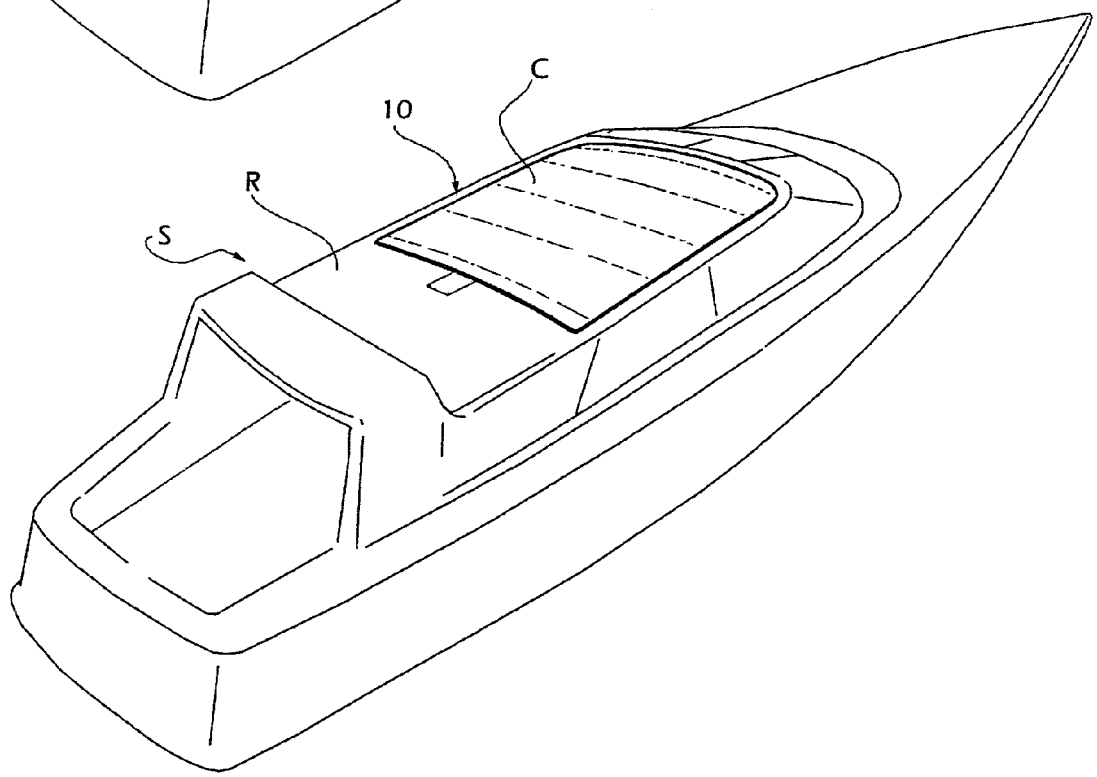
FIG. 2 is a perspective view of a vessel with a movement support system for an openable roof according to the present invention, in which the openable roof is constituted by a fabric sheet, shown in an extended condition.
Figure 6:
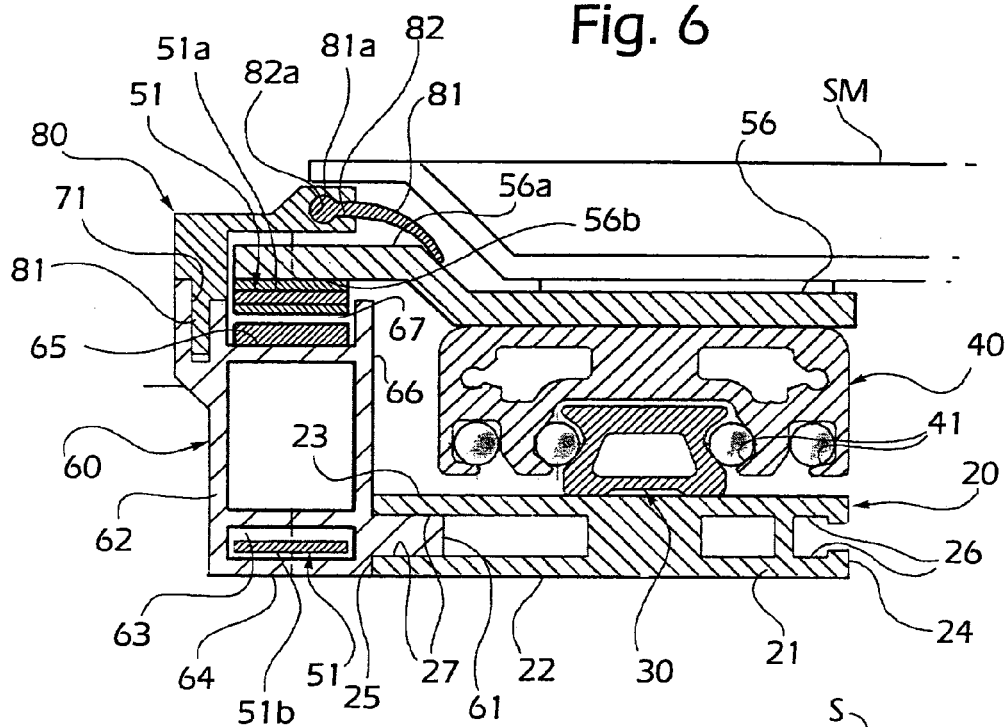
FIG. 6 is a schematic view in cross section of an embodiment of a movement support system for an openable roof for a vehicle according to the present invention, taken on the line VI—VI of FIG. 4.
Figure 5:
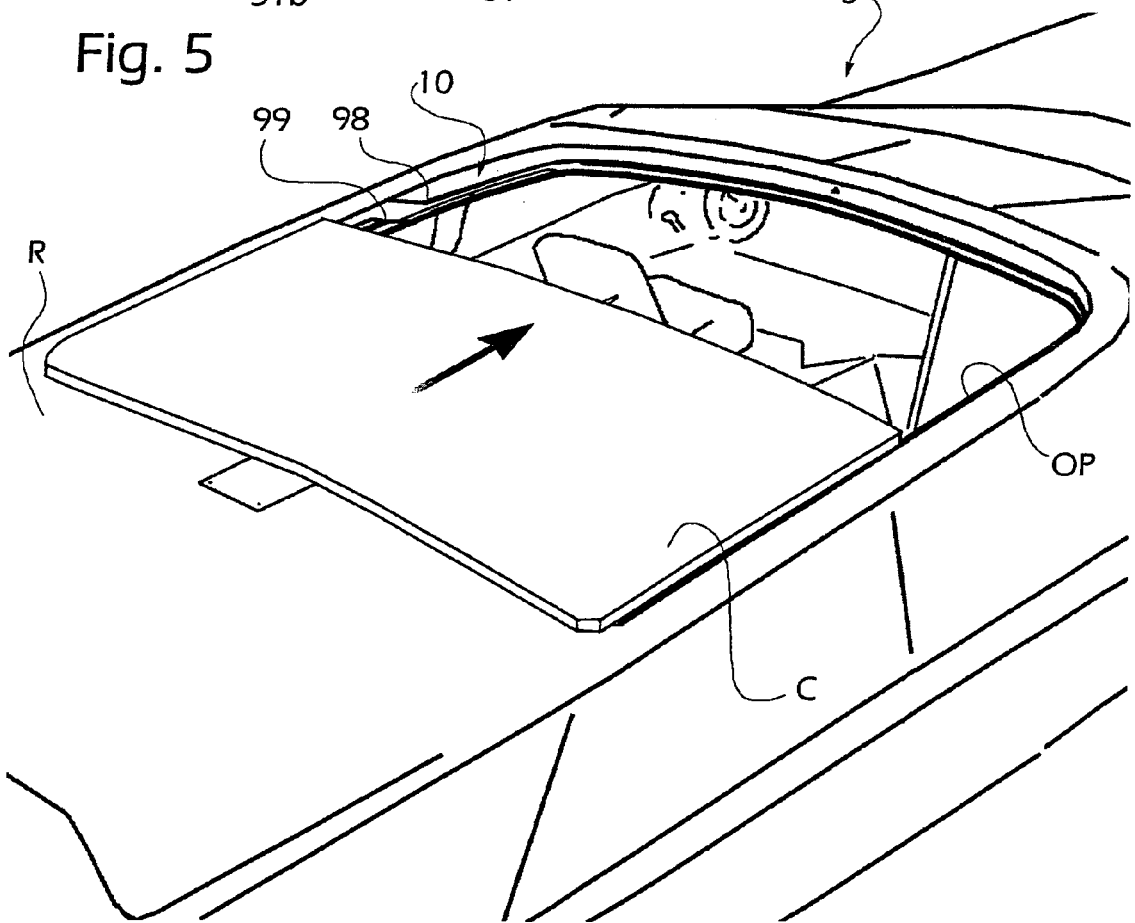
FIG. 5 is a perspective view of a vessel having a movement support system for an openable roof according to the present invention, in which the openable roof is constituted by a rigid panel, shown in an open condition.

FIGS. 3, 4 and 6 show a first embodiment 10 of the movement support system of the invention. The system 10 includes a pair of elongate support elements 20 in the form of rectilinear bars, one of which is illustrated in FIG. 6. The support elements 20 can be mounted on the roof of the vehicle on opposite sides of the opening. With reference to FIG. 6, each support element 20 comprises a body 21 of the support element 20, a lower surface 22 for resting on a corresponding surface of the vehicle roof near the edge of the opening, an upper surface 23, opposite the said lower surface, and right and left side surfaces 24, 25, arranged transversely with respect to the upper and lower surfaces 23, 22 and having respective formations 26, 27, the function of which will be described later. A track element 30 is arranged on the upper surface 23 of the support element 20, extending substantially parallel to the support element 20. In the embodiment illustrated, the track element 30 is mounted on the support element. Alternatively, this track element 30 could be formed in one piece with the support element 20. One or more carriage elements 40 are fitted onto the track element 30 so as to be slidable longitudinally, each connectable to a respective closure element of the openable roof, for example to the fabric sheet C of FIGS. 1 to 4 by means of the movable support SM. These carriage elements 40 are of a type known per se. In the embodiment shown, for example, each carriage element 40 includes two lateral portions, each with a race 41 for housing a plurality of ball bearings 42 engaged between a portion of the race 41 and a corresponding surface of the track element 30. A carriage of this type, with recirculating-ball bearings, is manufactured by Harken Inc., for example.

The formations 27 on the transverse surface 25 of the support element 20 are arranged so that an auxiliary component 60 for moving the openable roof can be fitted by coupling them to corresponding formations 61 present on the auxiliary component 60. In the embodiment illustrated, for example, the formations 27 on the support element 20 are constituted by a pair of parallel flanges extending laterally from the body 21 of the support element 20, while the formations 61 of the auxiliary component 60 are constituted by a rib extending laterally from the body 62 of the auxiliary component 60 and interposable between the flange formations 27 when the support element 20 is assembled with the auxiliary element 60, thereby forming a male-female coupling. This coupling could be a fixed joint or the two parts could be further secured by screws inserted in holes (not shown) formed through the flange formations 27 and rib 61 respectively of the support element 20 and the auxiliary component 60.

In the present embodiment, the auxiliary component 60 takes the form of a rectilinear section. A lower channel 63 is formed through the body 62 of this section, extending longitudinally along the component 60. The body 62 of the section has a lower surface 64 for resting on a corresponding surface of the roof of the vehicle, near the edge of the opening; an upper surface 65 opposite the lower surface 64; and a lateral surface 66, lying transversely with respect to the upper and lower surfaces 65 and 64, and bearing the formation 61 for coupling with the formations 27 of the support element 20. An upper channel 67 is formed in the upper surface 65 of the section, extending longitudinally along the auxiliary component 60. The channel 67 is upwardly open.

Transmission means are also mounted on the auxiliary component 60 for imparting movement controlled by a motor (indicated 101 in FIGS. 3 and 4) to at least one of the carriages 40 (indicated by the arrow VII in FIG. 4). In the present embodiment, the transmission means include a belt member 51 connected to at least one of the carriage elements 40 and closed in a loop about two end pulleys (indicated 111, 112 in FIGS. 3, 4 and 7a) mounted at either end of the auxiliary component 60, thereby forming two belt branches 51a, 51b extending longitudinally along the support elements 20. The belt member 51 could be constituted by a toothed belt, a chain or the like, with sufficient flexibility for the two branches 51a, 51b of the belt 51 to be spaced by a distance substantially to the order of a transverse dimension of the carriage elements 40. In this way, the transverse space taken up by the belt member 51 is substantially contained within the overall transverse space occupied by the assembly constituted by the support element, the track element and the carriage.

The lower branch 51b of the belt 51 can run within the lower channel 63 formed in the body 62 of the auxiliary component 60. The upper branch 51a of the belt 51 is arranged to be connected securely to at least one of the carriage elements 40. In the embodiment illustrated, this connection is provided by a fixing plate 56 mounted on the top of the carriage element/elements 40 intended to be connected to the belt 51. This plate 56 has a lateral extension 56a with a lower surface 56b which can be fixed to a portion of the belt 51. If the distance between the lower branch 51b and the upper branch 51a of the belt 51 is such that the upper branch 51a is not positioned at the same height as that of the upper surface of the carriage element 40, the extension 56a will be connected to the rest of the fixing plate 56 in such a way that it projects therefrom.

As shown in FIGS. 7 and 8, the ends 51e and 51s of the belt 51 are fitted on the extension 56a of the plate 56 of one of the carriage elements 40. In particular, the end 51e is secured to the extension 56a, while the end 51s is fitted adjustably along a slot 51l by means of an adjustment screw 51v in order to regulate the tension on the belt 51.

With the arrangement described above the fixing plate 56 acts as a connector element for connecting the branch 51a of the belt arranged in the upper channel 67 of the auxiliary component 60 to at least one of the carriage elements 40 when the support element 20 and the auxiliary component 60 are in their assembled condition.

Preferably, as shown only in FIG. 6, the element 60 for housing the belt has a slot 71 at the top to allow assembly of a protection element 80 by coupling it to a corresponding flap formation 81 on the protection element 80. This connection can be a fixed joint or the two parts could be further secured by screws passing through holes (not shown) formed through the flap formation 81 of the protection element 80 and through the walls of the slot 61 of the housing element 60 respectively. The protection element 80 is substantially a section of substantially the same length as the housing element 60 and, once assembled, is arranged over the upper channel 67 of the housing element 60 for protecting the belt 51.

It is even more preferable for the protection element 80 to have a lip 81 of a resilient material in order to improve its function of keeping out dirt. This lip 81 is in fact wide enough to close the longitudinal opening between the protection element 80 and the housing element 60, but is able to flex and lift onto the extension 56a of the fixing plate 56 when in a longitudinal position corresponding to the carriage element 40 bearing the fixing plate 56. The lip 81 has a bulbous base portion 81a which is transversally wider than the portion of the lip 81 immediately adjacent to it. In the drawing, the bulbous portion 81a is substantially circular in cross section and greater in diameter than the maximum thickness of the rest of the lip 81. The protection element 80 also has a channel 82 for housing part of the lip 81, with an enlarged base portion 82a, shaped to match the bulbous portion 81a of the lip 81 to allow this housing. The matching between the bulbous portion 81a of the lip 81 and the base portion 82a of the channel 82 prevents transverse extraction of the lip 81 from the channel 82.

Figure 9:
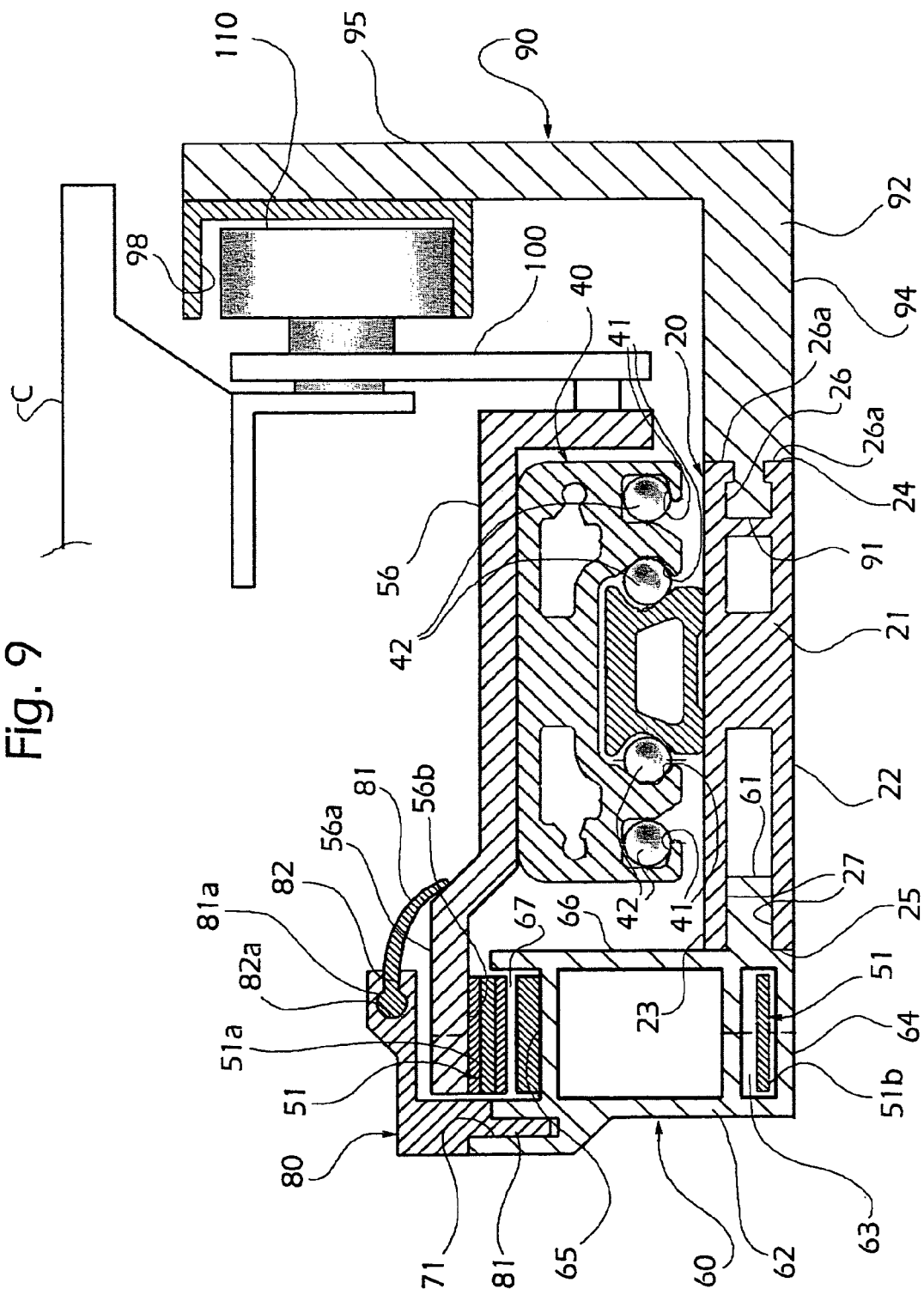
FIG. 9 is a schematic view in cross section, almost identical to that of FIG. 6 but with an additional component.

FIG. 9 shows substantially all the elements of FIG. 6, arranged near the edge of the opening OP in the roof R of the vessel S in a different arrangement. The formations 26 on the transverse face 24 of the support element 20 are arranged so that a second auxiliary component 90 for moving the openable roof can be fitted, by coupling the formations 26 to corresponding formations 91 on the auxiliary component 90. In the embodiment illustrated, for example, the formations 26 on the support element 20 are in the shape of a pair of parallel flanges extending laterally from the body 21 of the support element 20 and having terminal retaining portions 26a at their free ends which are bent inwards. The corresponding formations 91 on the auxiliary component 90 are formed as a bulbous projection extending laterally from the body 92 of the auxiliary component 90 for interposing between the flange formations 26 when the support element 20 is assembled with the auxiliary component 90, thereby forming a male-female coupling in which the retaining portions 26a of the flange formations 26 exert a transverse retaining action on the bulbous portion 91 of the auxiliary component 90. This coupling could involve the parts being further secured transversely by inserting screws through holes (not shown) formed in the formations 26 and 91 of the support element 20 and the auxiliary component 90 respectively.

In the present embodiment, the auxiliary component 90 is constituted by a rectilinear section with an L-shape cross section, one arm 94 of which is arranged substantially horizontally and carries the bulbous projection 91 on its free end, whilst the other arm 95, arranged substantially vertically, has a guide structure 98. This guide structure 98, of a type known in the art, has generally flat inclined surfaces (indicated 99 in FIG. 5) and is generally selected for openable roofs such as that of FIG. 5, which have at least some closure elements requiring a lifting movement in addition to the horizontal sliding movement imparted by the carriage elements. To this end, the closure elements C are not fixed to the carriage elements but are connected to them by means of articulated arms 100 with rollers 110 able to roll along a predetermined path along the guide structure 98.

Figure 10:
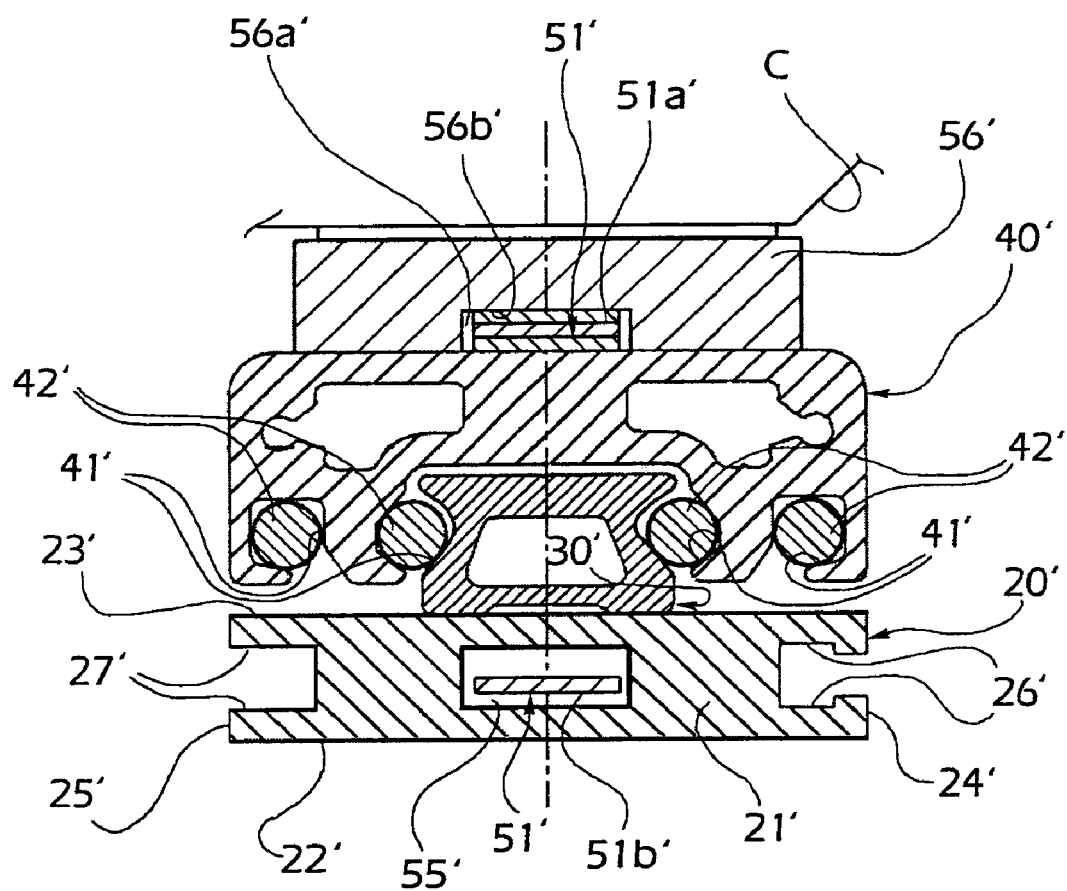
FIG. 10 is a schematic view in cross section of a different embodiment of the movement support system for an openable roof of a vehicle according to the present invention.

FIG. 10 illustrates another embodiment of the invention, represented in a similar way to FIG. 6. In this embodiment, the system 10 includes a pair of elongate support elements 20' in the shape of rectilinear bars, one of which is shown in section in FIG. 10. The support elements 20' can be mounted on the roof of the vehicle on opposite sides of the opening. With reference to FIG. 8, each of the support elements 20' comprises a body 21' of the support element 20', a lower surface 22' for resting on a corresponding surface of the roof of a vehicle near the edge of the opening, an upper surface 23', opposite the said lower surface, and right and left lateral surfaces 24', 25', arranged transverse the upper and lower surfaces 23', 22' and having respective formations 26', 27', the function of which will be described later. A track element 30' is arranged on the upper surface 23' of the support element 20', extending substantially parallel to the support element 20'. In the embodiment illustrated, the track element 30' is mounted on the support element. Alternatively, the track element 30' could be made in one piece with the support element 20'. One or more carriage elements 40', which can be connected to a respective closure element C of the openable roof, are mounted on the track element 30' for sliding longitudinally. These carriage elements 40' are of a type known in the art. In the embodiment illustrated, for example, each carriage element 40' comprises two lateral portions, each with a race 41' for receiving a plurality of ball bearings 42' engaged between a portion of the race 41' and a corresponding wall of the track element 30'. A carriage with recirculating-ball bearings of this type is manufactured by Harken Inc., for example.

Transmission means are also mounted on the support element 20' for imparting movement controlled by a motor (similar to that indicated 101 in FIGS. 3 and 4) to at least one of the carriage elements 40'. In the present embodiment, the transmission means include a belt member 51' connected to at least one of the carriage elements 40' and closed in a loop about two terminal pulleys (similar to those indicated 111, 112 in FIGS. 3 and 4) mounted at either end of the support element 20' so as to form two belt branches 51a', 51b' extending longitudinally along the support elements 20'. The belt member 51' can be constituted by a toothed belt, a chain or the like, being sufficiently flexible to allow the two branches 51a', 51b' of the belt 51' to be spaced by a distance substantially to the order of a transverse dimension of the carriage elements 40'. This ensures that the space taken up by the belt member 51' is substantially contained within the overall transverse space occupied by the assembly comprising the support element, the track element and the carriage.

The lower branch 51b' of the belt 51' is slidable within a channel 55' formed in the body 21' of the support element 20'. The channel 55' extends in the longitudinal direction of the support element 20' and is arranged beneath the track element 30', preferably in a transversely centred position. The upper branch 51a' of the belt 51' is arranged for secure connection to at least one of the carriage elements 40'. In the embodiment illustrated, this connection is provided by a fixing plate 56' fitted on the top of the carriage element/elements 40' which are to be connected to the belt 51'. The bottom of this plate 56' has a longitudinal channel 56a' for housing a portion of the belt 51', fixed to a base surface 56b, of the channel 56a'.

This embodiment differs from that of FIGS. 6 and 9 in that, in these embodiments, the auxiliary component 60 is essentially a housing element for the belt 51, separate from the support element 20.

Figure 11:
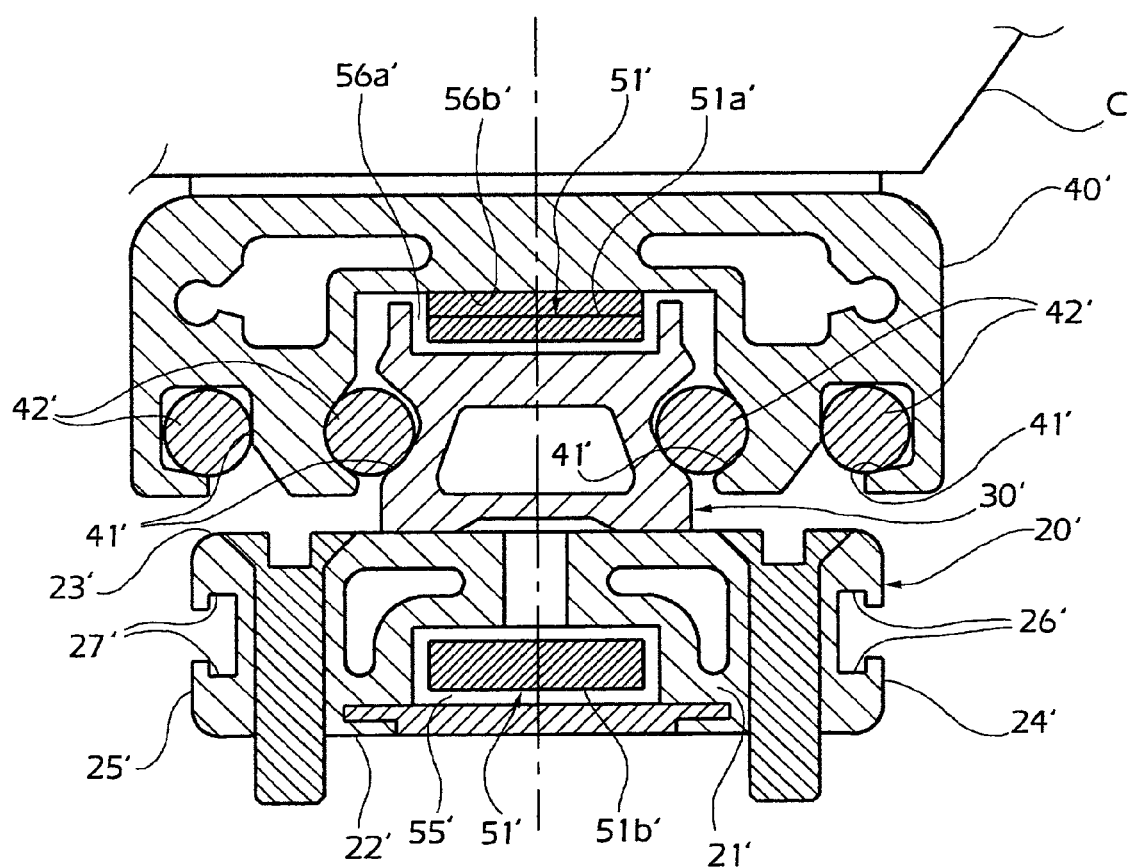
FIG. 11 is a schematic view in cross section of a variant of the embodiment of FIG. 10.

FIG. 11 shows a preferred variant of the embodiment of FIG. 10. Elements corresponding to those of that embodiment have been indicated by the same reference numbers. This variant differs from that of FIG. 10 in that the upper branch 51a' of the belt 51' is interposed between the track element 30' and the carriage element or elements 40'. To this end, the lower face of the carriage elements 40' and/or the upper surface of the track element 30' has a longitudinal channel 56a' for housing the upper branch 51a' of the belt 51'. The belt 51' is then secured to the lower surface of the carriage element/elements 40' intended to be secured to it. For the other characteristics reference is made to the parts of the description relating to FIG. 10.

As shown in FIGS. 3 and 4, and in substantially the same way for each of the embodiments described above, each of the end pulleys 111 is controlled by the motor 101, preferably a single electric motor of a known type, via respective shafts 121 and universal joints 131. Alternatively, a motor 141 could be associated with each pulley 111, as shown in broken outline in FIGS. 3 and 4. The motors mentioned above can be controlled by an operator either using a push-button panel (not shown) of a known type or a remote control.

As shown in FIGS. 3 and 4, and in substantially the same way for each embodiment described above, an end-of-travel sensor 151 of a known type is associated with each end of one of the track elements 30, 30', which can be activated by one of the carriage elements in order to cut power to the motors 101 or 141. Alternatively, this end-of-travel stop function could be achieved by associating a respective encoder (not shown) with a motor 101 or 141 for counting the number of revolutions thereof.

It is clear that the embodiments described here are to be considered as non-limitative examples of embodiments of the invention; modifications to the invention can be made to the shape and arrangement of parts and to manufacturing and operating details, according to numerous possible variants which appear suitable to an expert in the art.

What is claimed is:

1. A movement support system for an openable roof of a vehicle which can be fitted to an opening formed in the roof of the vehicle for movably supporting at least one closure element operable selectively to close the said opening, including:
   a pair of elongate support elements each in the shape of a rectilinear bar, for mounting on the roof of the vehicle on opposite sides of the said opening, each of the said support elements having a track element extending substantially parallel to the said support element and with one or more carriage elements mounted thereon for connection to the said closure element, and
   transmission means for imparting movement controlled by a motor to at least one of the said one or more carriage elements, the said transmission means including a belt member connected to at least one of the said one or more carriage elements and closed in a loop about two end pulleys so as to form two belt branches extending in the longitudinal direction of the support elements and spaced by a distance substantially to the order of a transverse dimension of the said carriage elements.

2. A system according to claim 1, in which the body of at least one support element has a channel extending longitudinally along it and arranged beneath the said track element, the said transmission means being mounted on the said support element in such a way that the said two belt branches extend beneath and above the said carriage elements respectively.

3. A system according to claim 1, in which the body of at least one support element has a channel extending longitudinally along it, arranged beneath the said track element and the body of the said track element has a channel extending longitudinally along it and being provided on the upper surface thereof, the said transmission means being mounted on the said support element in such a way that the two belt branches extend beneath and above the said track element respectively.

4. A system according to claim 2 or claim 3, in which the belt branch above the said carriage elements or above the track element is intended to be connected to at least one of the said carriage elements.

5. A system according to any of claims 2 to 3, in which the channel in the said support element is centered transversely with respect to the said track element.

6. A system according to claim 1, which also includes an elongate element for housing the belt, mountable parallel to a corresponding one of the said elongate support elements, the said belt housing element having upper and lower channels extending longitudinally along it, the said transmission means being mounted on the said housing element in such a way that the said two belt branches extend in the said upper and lower channels respectively.

7. A system according to claim 6, in which a protection element is mounted on the upper channel for protecting the belt from dirt, the said protection element being configured so as to form a longitudinal aperture between it and the housing element so as to allow connector elements securing the belt to at least one of the said carriage elements to move longitudinally.

8. A system according to claim 7, also including a lip of a resilient material, fitted to the said protection element and having a sufficient transversal extension to close the longitudinal gap between the protection element and the housing element, the said lip being able to flex and allow longitudinal movement of the connector elements which secure the belt to at least one of the said carriage elements.

9. A system according to claim 1, also including at least one auxiliary component in the form of a rectilinear section, for mounting parallel to a corresponding one of the said elongate support elements, the rectilinear element having a guide structure provided to guide roller elements mounted on pivotable arms which connect at least one closure element to the corresponding carriage elements.

10. A support element for a movement support system for an openable roof of a vehicle the system being mountable to an opening formed in the roof of the vehicle and operable movably to support at least one closure element for selectively covering the said opening, in which the said support element extends as a rectilinear bar, including a lower surface for resting on a corresponding surface of the roof of the vehicle near the edge of the opening, and an upper surface opposite the said lower surface with a track element arranged thereon substantially parallel to the said support element, at least one carriage element mounted on the said track element so as to be slidable longitudinally thereon, in which the support element has at least one lateral surface arranged transverse the said upper and lower surfaces and having a formation for coupling to a corresponding formation provided on an auxiliary component for moving the openable roof, which can be fitted to the support element.

11. A support element according to claim 10, in which the body of the said support element has a channel extending longitudinally along it and arranged beneath the said track element, transmission means being provided for imparting movement controlled by a motor to at least one of the said one or more carriage elements, the said transmission means including a belt member closed in a loop around two end pulleys so as to form two belt branches extending longitudinally along the support elements, one arranged in the said channel and the other above the said carriage elements, with the two spaced by a distance substantially to the order of a transverse dimension of the said carriage elements.

12. An element according to claim 11, in which the belt branch, arranged above the carriage elements, is connectable to at least one of the said carriage elements.

13. An element according to claims 11 or 12, in which the channel in the said support element is transversely centered relative to the track element.

14. An element for housing a belt of a movement support system for an openable roof of a vehicle the system being fitted to an opening formed in the roof of the vehicle for movably supporting at least one closure element operable selectively to cover the said opening, in which the said housing element for the belt is intended to be assembled together with the support element according to claim 10, is configured as a rectilinear section, and includes
   a body, with a lower channel formed therein, extending longitudinally along the housing element,
   a lower surface for resting on a corresponding surface of the roof of the vehicle near the edge of the opening,
   an upper surface, opposite the said lower surface, with an upper channel formed therein along the length of the said housing element, transmission means for imparting movement controlled by a motor to at least one of the said one or more carriage elements, the said transmission means including a belt member closed in a loop about two end pulleys in such a way as to form two belt branches extending longitudinally along the support elements in the said upper and lower channels respectively and spaced by a distance substantially to the order of a transverse dimension of the said carriage elements, and at least one lateral surface arranged transversely with respect to the said upper and lower surfaces and having a formation for coupling to a corresponding formation provided on the said support element, a connector element being provided for connecting the belt branch arranged in the upper channel to at least one of the said carriage elements when the said support element and the said housing element for the belt are in their assembled condition.

* * * * *